(12) United States Patent
Byun et al.

(10) Patent No.: US 10,798,648 B2
(45) Date of Patent: Oct. 6, 2020

(54) METHOD FOR PERFORMING PLMN SELECTION AND DEVICE SUPPORTING THE SAME

(71) Applicant: LG ELECTRONICS INC., Seoul (KR)

(72) Inventors: Bokyung Byun, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/629,023

(22) PCT Filed: Aug. 13, 2018

(86) PCT No.: PCT/KR2018/009265
§ 371 (c)(1),
(2) Date: Jan. 6, 2020

(87) PCT Pub. No.: WO2019/031945
PCT Pub. Date: Feb. 14, 2019

(65) Prior Publication Data
US 2020/0137680 A1 Apr. 30, 2020

Related U.S. Application Data (60) Provisional application No. 62/544,016, filed on Aug. 11, 2017.

(51) Int. Cl.
*H04W 4/00* (2018.01)
*H04W 48/18* (2009.01)
(Continued)

(52) U.S. Cl.
CPC ........... *H04W 48/18* (2013.01); *H04W 48/16* (2013.01); *H04W 76/27* (2018.02); *H04W 84/042* (2013.01)

(58) Field of Classification Search
CPC ... H04W 48/18; H04W 76/27; H04W 84/042; H04W 48/16; H04W 76/18
See application file for complete search history.

(56) References Cited

U.S. PATENT DOCUMENTS

| 2012/0021734 A1* | 1/2012 | Shi ........................ H04W 48/16 455/422.1 |
| 2013/0044660 A1* | 2/2013 | Edara .................... H04W 76/28 370/311 |

(Continued)

FOREIGN PATENT DOCUMENTS

| DE | 112014003063 | 3/2016 |
| WO | 2015116718 | 8/2015 |
| WO | 2016163635 | 10/2016 |

OTHER PUBLICATIONS

PCT International Application No. PCT/KR2018/009265, International Search Report dated Nov. 27, 2018, 2 pages.

*Primary Examiner* — Barry W Taylor
(74) *Attorney, Agent, or Firm* — Lee, Hong, Degerman, Kang & Waimey (57) ABSTRACT

Provided are a method of performing public land mobile network (PLMN) selection and a device supporting the method. According to one embodiment of the present invention, a method for performing PLMN selection in a wireless communication system includes: entering an RRC_INACTIVE state; transmitting, to a non-access stratum (NAS) layer of the UE, information on whether or not there is on-going data; receiving, from the NAS layer of the UE, a request of a PLMN searching when there is no on-going data; and performing the PLMN searching based on the request of the PLMN searching.

13 Claims, 7 Drawing Sheets

(51) Int. Cl.
*H04W 76/27* (2018.01)
*H04W 48/16* (2009.01)
*H04W 84/04* (2009.01)

(56) References Cited

U.S. PATENT DOCUMENTS

| | | |
|---|---|---|
| 2015/0004966 A1* | 1/2015 | Ayleni .............. H04W 36/0005 |
| | | 455/433 |
| 2015/0296364 A1 | 10/2015 | Peruru et al. |
| 2017/0105136 A1 | 4/2017 | Reider et al. |
| 2018/0213452 A1* | 7/2018 | Kim ................. H04W 36/0033 |
| 2018/0302803 A1* | 10/2018 | Ramachandra ... H04W 36/0094 |
| 2018/0359681 A1* | 12/2018 | Futaki ................... H04W 48/16 |
| 2019/0319686 A1* | 10/2019 | Chen, IV ............. H04W 72/046 |
| 2019/0349838 A1* | 11/2019 | Futaki ................... H04W 48/08 |

* cited by examiner

METHOD FOR PERFORMING PLMN SELECTION AND DEVICE SUPPORTING THE SAME

CROSS-REFERENCE TO RELATED APPLICATIONS

This application is the National Stage filing under 35 U.S.C. 371 of International Application No. PCT/KR2018/009265, filed on Aug. 13, 2018, which claims the benefit of U.S. Provisional Application No. 62/544,016 filed on Aug. 11, 2017, the contents of which are all hereby incorporated by reference herein in their entirety.

BACKGROUND OF THE INVENTION

Field of the Invention

The present invention relates to a wireless communication system, and more particularly, to a method for performing PLMN selection efficiently and a device supporting the same.

Related Art

Efforts have been made to develop an improved 5th-generation (5G) communication system or a pre-5G communication system in order to satisfy a growing demand on radio data traffic after commercialization of a $4^{th}$-generation (4G) communication system. A standardization act for a 5G mobile communication standard work has been formally started in 3GPP, and there is ongoing discussion in a standardization working group under a tentative name of a new radio access (NR).

Meanwhile, an upper layer protocol defines a protocol state to consistently manage an operational state of a user equipment (UE), and indicates a function and procedure of the UE in detail. In the discussion on the NR standardization, an RRC state is discussed such that an RRC_CONNECTED state and an RRC_IDLE state are basically defined, and an RRC_INACTIVE state is additionally introduced.

Meanwhile, the PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted. In PLMN selection, cell selection, and cell re-selection, various types of PLMNs may be considered by the UE.

SUMMARY OF THE INVENTION

According to a prior art, Meanwhile, the AS layer made to support for PLMN selection (i.e. providing available PLMNs to UE NAS) for a UE in RRC_INACTIVE. Considering that a UE in RRC_INACTIVE is in EMM_CONNECTED, in principle PLMN selection cannot be applied to RRC_INACTIVE because that PLMN selection in LTE are only applicable to EMM_IDLE and RRC_IDLE.

According to one embodiment of the present invention, a method for performing, by an access stratum (AS) layer of a user equipment (UE), public land mobile network (PLMN) selection in a wireless communication system is provided. The method may comprise: entering an RRC_INACTIVE state; transmitting, to a non-access stratum (NAS) layer of the UE, information on whether or not there is on-going data; receiving, from the NAS layer of the UE, a request of a PLMN searching when there is no on-going data; and performing the PLMN searching based on the request of the PLMN searching.

The method may further comprise: transmitting at least one of searched PLMN to the NAS layer of the UE; and receiving a request of PLMN selection in response to the transmitted searched PLMN.

The method may further comprise: performing a PLMN selection according to the request of PLMN selection.

The method may further comprise: if a radio access network (RAN) paging message is received during the PLMN searching, stopping the PLMN searching.

The method may further comprise: if an uplink data or uplink signaling is detected during the PLMN searching, stopping the PLMN searching.

The method may further comprise: informing the NAS layer of the UE a failure of the PLMN searching, when the PLMN searching is stopped.

The method may further comprise: receiving an indication of state transition to an RRC_IDLE state from the NAS layer; and wherein the PLMN selection is performed after state transition from the RRC_INACTIVE state to the RRC_IDLE state according to the indication.

The request of PLMN selection may be received after the UE enters RRC_IDLE according to a NAS detach procedure.

The PLMN selection may be performed after state transition from the RRC_INACTIVE state to an RRC_CONNECTED state.

According to another embodiment of the present invention, a user equipment (UE) in a wireless communication system is provided. The UE may comprise: a transceiver for transmitting or receiving a radio signal; and a processor coupled to the transceiver, the processor configured to: enter an RRC_INACTIVE state; transmit, to a non-access stratum (NAS) layer of the UE, information on whether or not there is on-going data; receive, from the NAS layer of the UE, a request of public land mobile network (PLMN) searching when there is no on-going data, from the NAS layer of the UE; and perform the PLMN searching based on the request of the PLMN searching.

The processor may be further configured to: transmit at least one of searched PLMN to the NAS layer of the UE; and receive a request of PLMN selection in response to the transmitted searched PLMN.

The processor may be further configured to: perform a PLMN selection according to the request of PLMN selection.

The processor may be further configured to: if a radio access network (RAN) paging message is received during the PLMN searching, stop the PLMN searching.

The processor may be further configured to: if an uplink data or uplink signaling is detected during the PLMN searching, stop the PLMN searching.

The processor may be further configured to: inform the NAS layer of the UE a failure of the PLMN searching, when the PLMN searching is stopped.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
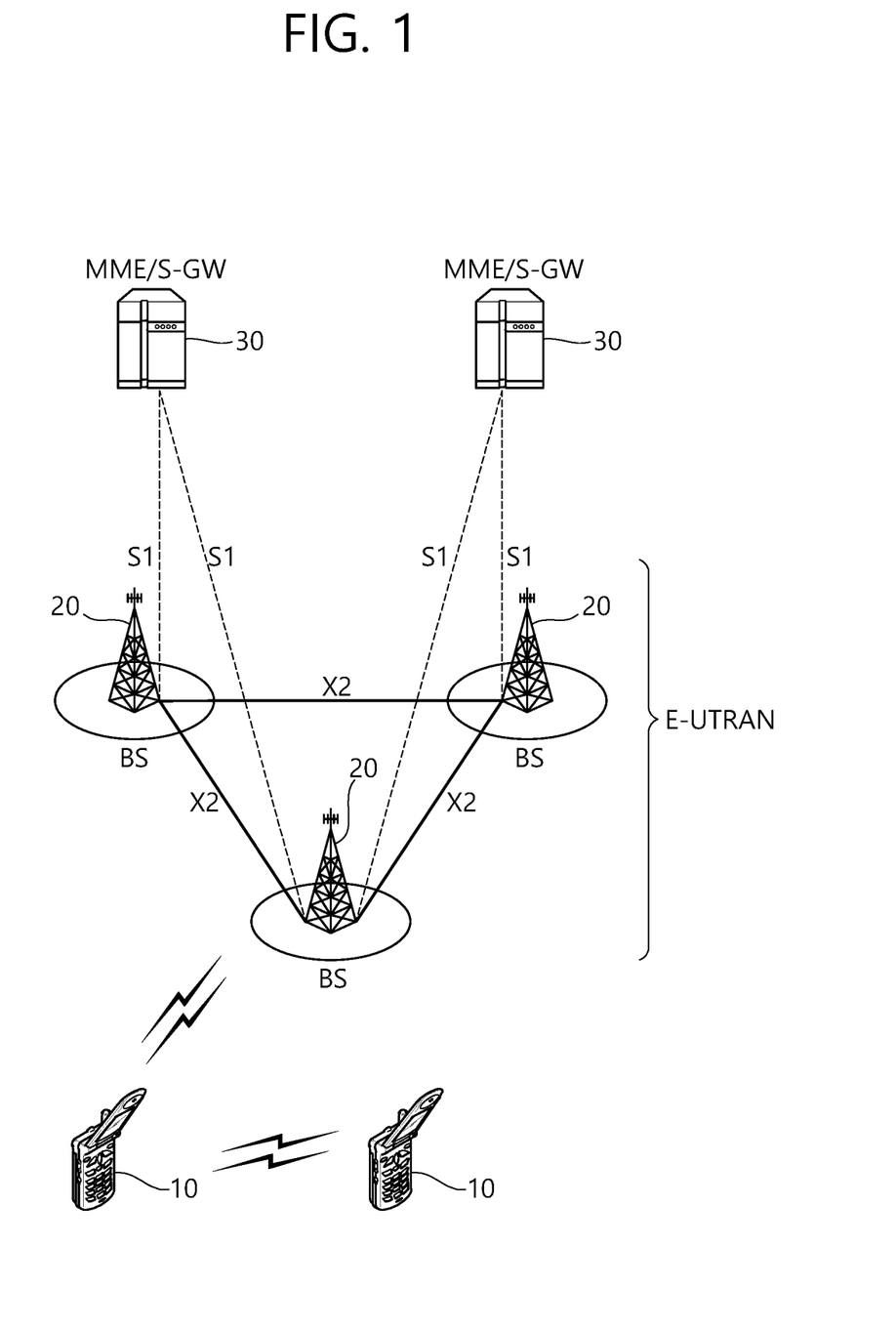
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
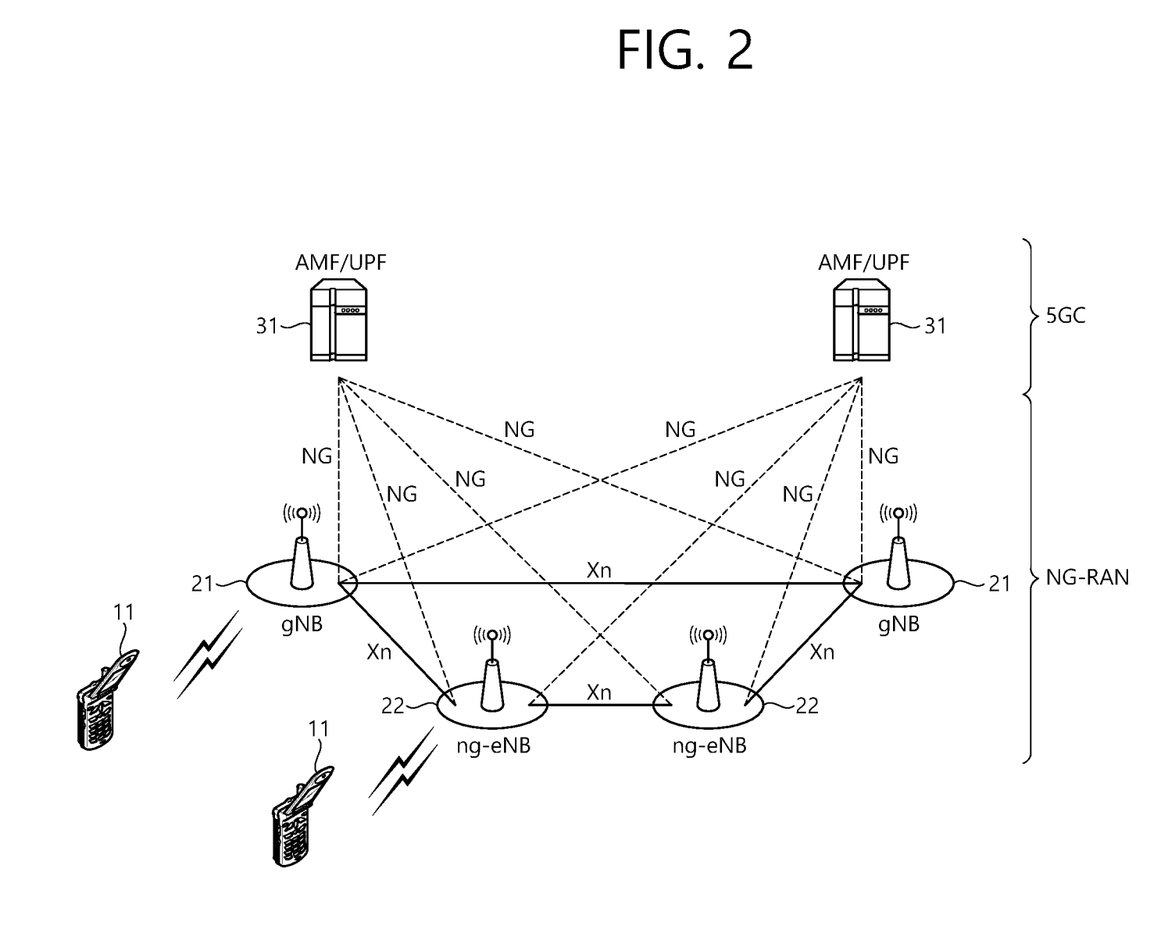
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
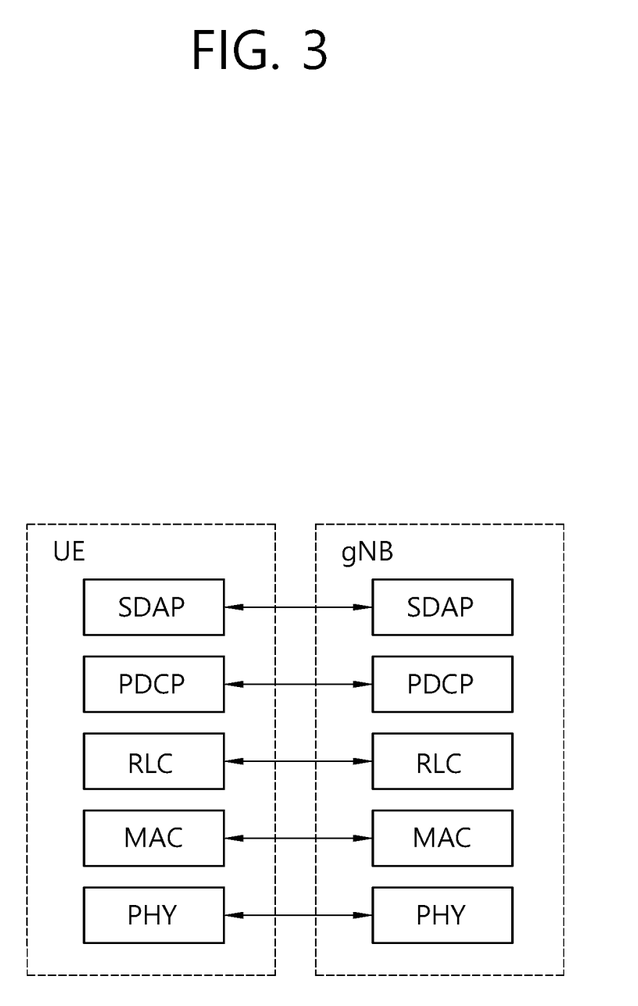
FIG. 3 shows a block diagram of a user plane protocol stack to which technical features of the present invention can be applied.
Figure 4:
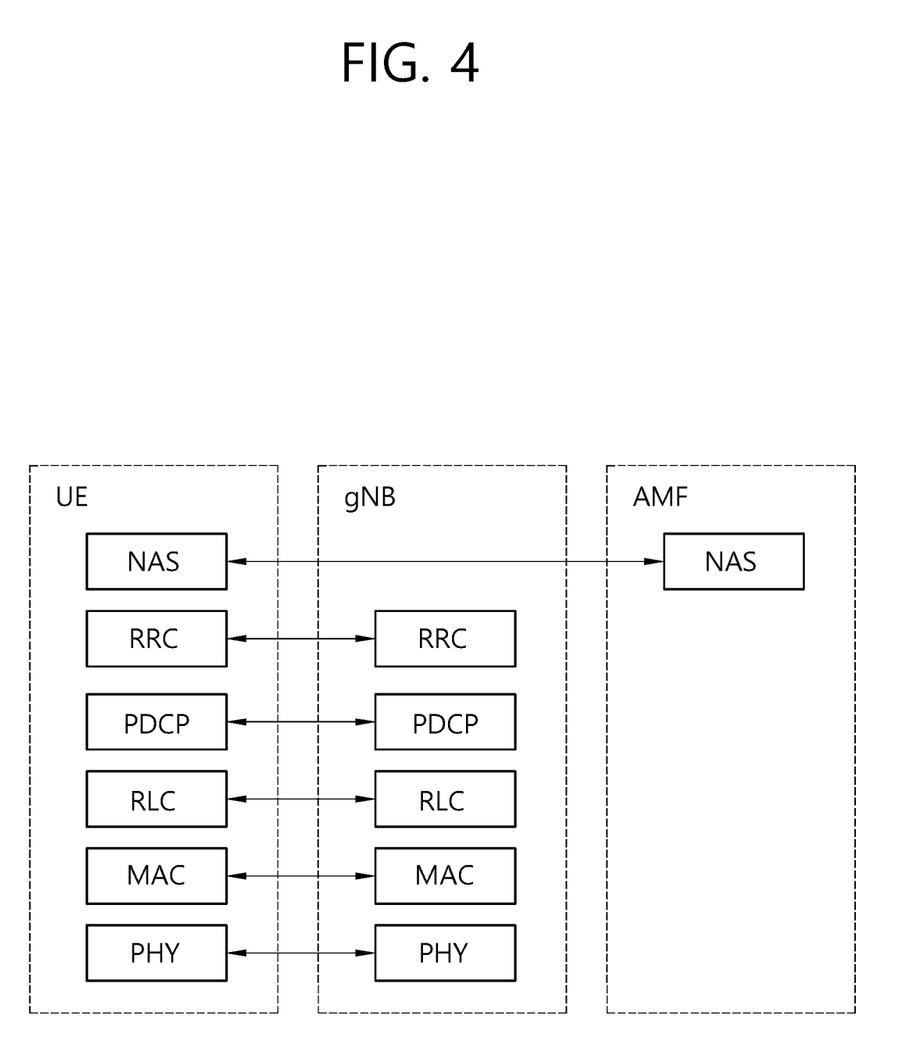
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 0.4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sub-layer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted. In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN. Next, among the cells provided by the selected PLMN, the UE selects a cell having signal quality and characteristic which may receive a suitable service. The PLMN selection has been performed in EMM-DEREGISTERED and ECM-IDLE.

Meanwhile, the AS layer may support for PLMN selection (i.e. providing available PLMNs to UE NAS) for a UE in RRC_INACTIVE. Considering that a UE in RRC_INACTIVE is in EMM_CONNECTED, the PLMN selection cannot be applied to RRC_INACTIVE because that PLMN selection in LTE are only applicable to EMM_IDLE and RRC_IDLE.

Actually, UEs in their HPLMN do not perform PLMN selection during in RRC_INACTIVE. However, unless PLMN selection (i.e. providing available PLMNs to UE NAS requested by the search of higher priority PLMN) is supported, UEs in a VPLMN, in other words, roaming UEs could not have a chance to return to the HPLMN until transition to RRC_IDLE, and this would lead a service availability degradation of the UEs. Therefore, in order to support PLMN selection (i.e. providing available PLMNs to UE NAS) in EMM_CONNECTED and RRC_INACTIVE, an enhancement of interaction between the UE AS and the UE NAS is required.

Hereinafter, a method for performing PLMN selection according to an embodiment of the present invention is described. According to an embodiment of the present invention, a method for supporting PLMN selection while in inactive condition in VPLMN is proposed. In this description, a UE in inactive condition may be at least a UE in RRC_INACTIVE in NR, in lightweight connection in LTE, suspended stated, or in lightweight connection in eLTE. A RAN node may be at least gNB in NR, eNB in LTE or eNB in eLTE. In addition, RRC connection activation may be at least RRC Connection Resume procedure or RRC Connection Re-establishment procedure.

Figure 5:
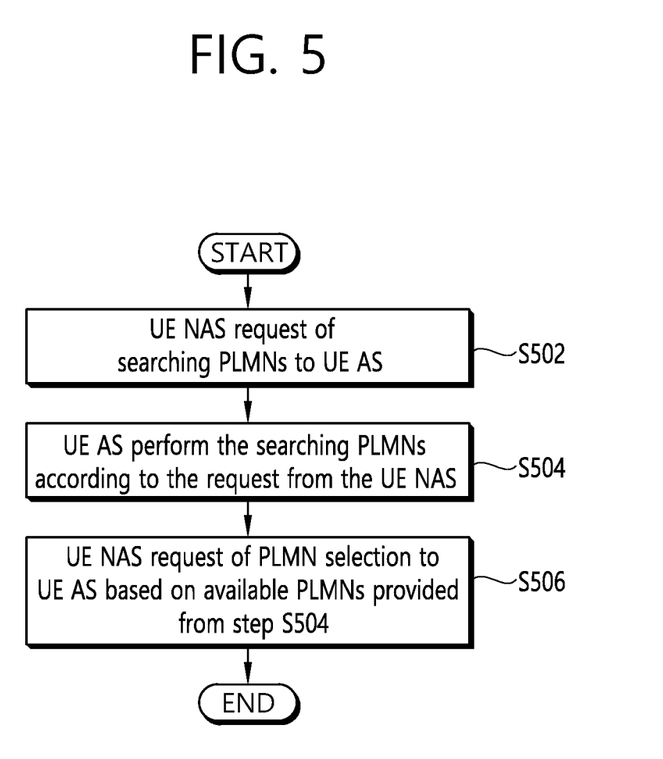
FIG. 5 shows an example of a method for performing PLMN selection according to an embodiment of the present invention.

FIG. 5 shows an example of a method for performing PLMN selection according to an embodiment of the present invention. Referring to FIG. 5, from the UE AS perspective, the PLMN selection in inactive condition can be described as follow.

In step S502, UE NAS may request of searching PLMNs to UE AS.

In this step, the UE NAS does not know if the UE AS is in inactive condition or in RRC_CONNECTED during in EMM_CONNECTED. After searching available PLMNs according to the request, the UE AS may report the searched available PLMNs. If the UE AS should report the available PLMNs to the UE NAS while there are on-going data transmission/reception, it would lead degradation of throughput and service quality to the user. Therefore, the UE NAS should be able to recognize the RRC state of the UE to prevent UE AS from reporting the available PLMNs when there is on-going data transmission/reception.

To do this, the UE AS may notify that the UE is in inactive condition to UE NAS when the UE moves to inactive condition. Further, the UE AS may notify that the UE is leaving the inactive condition to UE NAS when the UE AS exits from inactive condition. In addition, because it is assumed that the data transmission in inactive condition is possible, the UE AS may inform the UE NAS whether there is on-going data transmitted or received or not in order to avoid interrupt on-going data transmission/reception. In other words, the UE AS may notify the RRC state of the UE and whether there is on-going data transmission/reception to UE NAS.

In step S504, the UE AS may perform the searching PLMNs according to the request from the UE NAS. The searching PLMNs while in inactive condition may be performed as similar as the way in RRC_IDLE. Thus, when the searching PLMNs is successfully completed, the UE AS will report the available PLMNs to the UE NAS.

However, there may be exceptional cases while searching PLMNs in inactive condition compared to the cases in RRC_IDLE. For example, the case when RAN paging is received while searching PLMNs may be the exceptional case. Also, the case when the MO data/signaling arrives at UE AS while searching PLMNs may be the exceptional case. From the end user perspective, in the above exceptional cases, it is reasonable to prioritize to process data just arrived or just tried to transmit rather than returning to HPLMN. Therefore, if the UE receives RAN paging or detects uplink data/signaling during the searching PLMNs, the UE AS in inactive condition may stop searching PLMNs by itself, and may inform the UE NAS the failure of the searching PLMNs.

In step S506, the UE NAS may request of PLMN selection to UE AS based on available PLMNs provided from step S504.

According to an embodiment of the present invention, the UE NAS may receive available PLMNs list from UE AS. The available PLMNs list may include "user controlled PLMN selector" or "operator controlled PLMN selector". The "user controlled PLMN selector" or "operator controlled PLMN selector" in the available PLMNs list may include HPLMN, EHPLMN or higher priority PLMN. If the UE NAS in inactive condition in VPLMN finds HPLMN, EHPLMN or higher priority PLMN, the UE NAS may attempt to access the higher priority PLMN. There could be several options how the UE moves to the higher priority PLMN as below.

1) Option 1: Perform PLMN selection after transition to RRC_IDLE state autonomously.

According to option 1, the UE NAS may request autonomous RRC connection release to the UE AS by itself, and the UE AS may perform a process of leaving RRC_CONNECTED state for the PLMN selection. For example, the UE AS may delete UE context which stored when transitioning state to inactive condition. Further, the UE AS may release all radio resources, including the RLC entity, the MAC configuration and the associated PDCP entity for all established RBs.

After state transition to RRC_IDLE state, the UE NAS may request PLMN selection to UE AS with selected the PLMN from a list of reported PLMN.

2) Option 2: Perform PLMN selection after state transition to RRC_IDLE state via NAS Detach procedure.

According to option 2, the UE NAS may initiate NAS Detach procedure in order to enter RRC_IDLE state for PLMN selection. The UE AS may initiate RRC connection activation procedure for NAS Detach procedure. After the successful NAS detach procedure, the UE may transit state to RRC_IDLE state. After state transition to RRC_IDLE state, the UE NAS may request PLMN selection to UE AS with the selected PLMN from a list of reported PLMN.

3) Option 3: Perform PLMN selection after transition to RRC_CONNECTED state.

The UE NAS may request of PLMN selection to UE AS with the selected PLMN from a list of reported PLMN. The UE AS may initiate RRC connection activation procedure for PLMN selection requested by the UE NAS.

The UE AS may provide the network with information that it is resumption for PLMN selection. The selected PLMN can be included in RRC Connection activation request message or RRC Connection activation complete message. In order to perform handover, the RAN node can decide the target RAN node considering the distance from the source RAN node among the RAN nodes in the selected PLMN. The identity of a cell that recognized the selected PLMN and measured RSRP of that cell can be included in RRC Connection activation request message or RRC Connection activation complete message.

Based on the network situation, e.g., whether the network has an interface between the source RAN node and the target RAN node, the network may start handover procedure via RRC Connection Reconfiguration procedure.

If the handover to target RAN node is impossible, the network may let the UE exit from inactive condition based on the information the UE provided, in order to perform PLMN selection in RRC_IDLE state.

4) Option 4: Perform PLMN selection while in RRC_I-NACTIVE state.

The UE NAS may request of PLMN selection to UE AS based on the list of reported PLMN. If a cell that recognized the selected PLMN satisfy the cell reselection criterion, the UE may perform cell reselection to that cell, and may inform the UE NAS a completion of cell reselection. The UE NAS may initiate TAU on a new cell in the selected PLMN. The UE AS may initiate RRC connection activation procedure. Upon receiving the RRC connection activation request message, the network may perform context fetch if possible, and process TAU procedure. If the context fetch fails, the network may transmit TAU rejection message to the UE.

Figure 6:
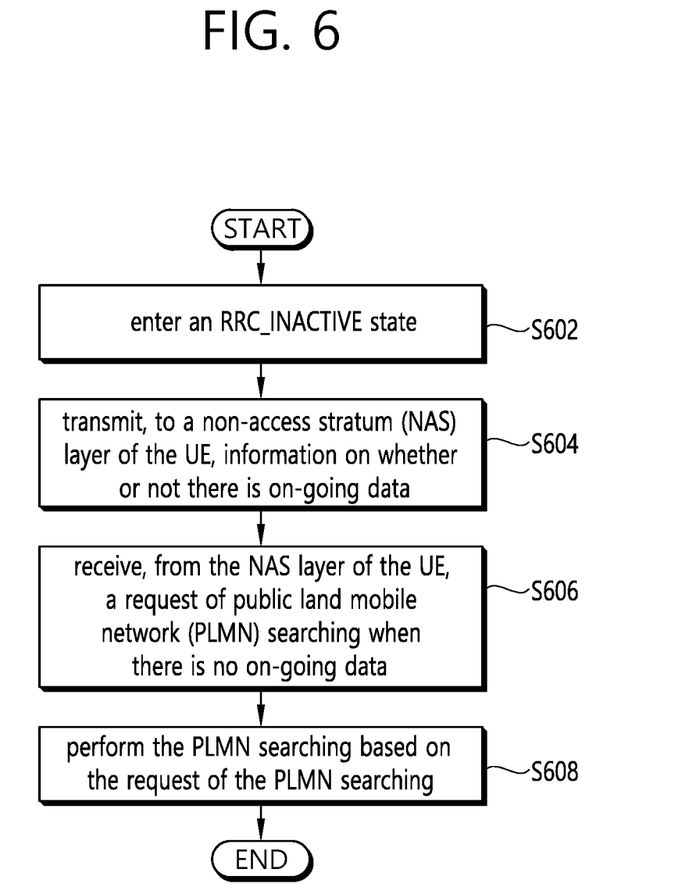
FIG. 6 shows an example of a method for performing PLMN selection according to an embodiment of the present invention.

FIG. 6 shows an example of a method for performing PLMN selection according to an embodiment of the present invention.

In step S602, the AS layer of the UE may enter an RRC_INACTIVE state. In step S604, the AS layer of the UE may transmit, to a non-access stratum (NAS) layer of the UE, information on whether or not there is on-going data. In step S606, the AS layer of the UE may receive, from the NAS layer of the UE, a request of public land mobile network (PLMN) searching when there is no on-going data. In step S608, the AS layer of the UE may perform the PLMN searching based on the request of the PLMN searching.

Further, the AS layer of the UE may transmit at least one of searched PLMN to the NAS layer of the UE; and receive a request of PLMN selection in response to the transmitted searched PLMN. Further, the AS layer of the UE may perform a PLMN selection according to the request of PLMN selection. Further, the AS layer of the UE may stop the PLMN searching, if a RAN paging message is received during the PLMN searching. Further, the AS layer of the UE may stop the PLMN searching, if an uplink data or uplink signaling is detected during the PLMN searching. Further, the AS layer of the UE may inform the NAS layer of the UE a failure of the PLMN searching, when the PLMN searching is stopped. Further, the AS layer of the UE may receive an indication of state transition to an RRC_IDLE state from the NAS layer; and wherein the PLMN selection is performed after state transition from the RRC_INACTIVE state to the RRC_IDLE state according to the indication. The request of PLMN selection may be received after the UE enters RRC_IDLE according to a NAS detach procedure. The PLMN selection may be performed after state transition from the RRC_INACTIVE state to an RRC_CONNECTED state.

Figure 7:
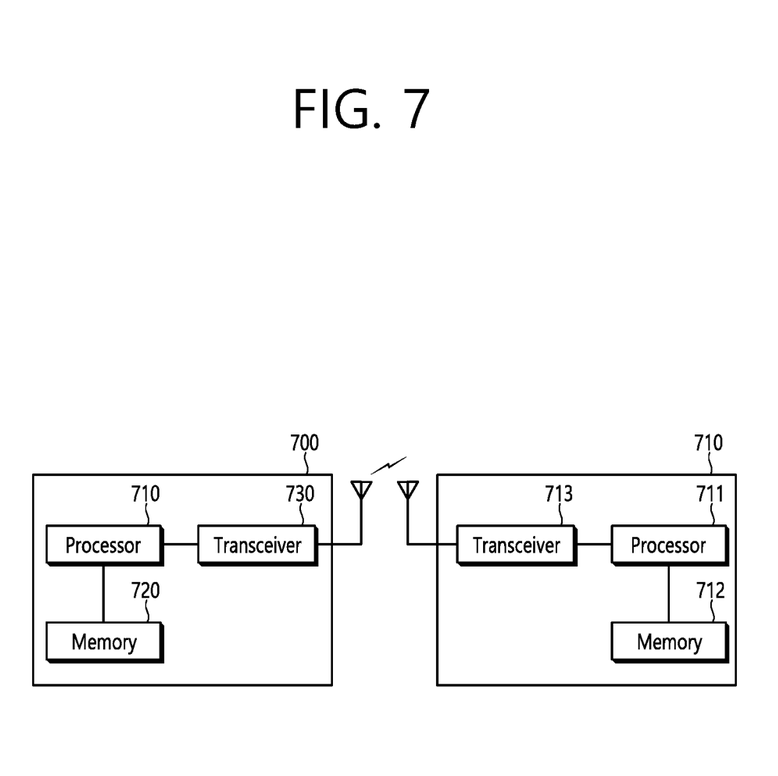
FIG. 7 shows a communication system to implement an embodiment of the present invention.

FIG. 7 shows a communication system to implement an embodiment of the present invention.

A UE 700 includes a processor 701, a memory 702, and a transceiver 703. The memory 702 is coupled to the processor 701, and stores a variety of information for driving the processor 701. The transceiver 703 is coupled to the processor 701, and transmits and/or receives a radio signal. The processor 701 implements the proposed functions, procedures, and/or methods. In the aforementioned embodiments, an operation of the first network node may be implemented by the processor 701.

A network node 710 includes a processor 711, a memory 712, and a transceiver 713. The memory 712 is coupled to the processor 711, and stores a variety of information for driving the processor 711. The transceiver 713 is coupled to the processor 711, and transmits and/or receives a radio signal. The processor 711 implements the proposed functions, procedures, and/or methods. In the aforementioned embodiments, an operation of the second network node 710 may be implemented by the processor 711.

The processors 711 may include application-specific integrated circuit (ASIC), other chipset, logic circuit and/or data processing device. The memories may include read-only memory (ROM), random access memory (RAM), flash memory, memory card, storage medium and/or other storage device. The transceivers may include baseband circuitry to process radio frequency signals. When the embodiments are implemented in software, the techniques described herein can be implemented with modules (e.g., procedures, functions, and so on) that perform the functions described herein. The modules can be stored in memories and executed by processors. The memories can be implemented within the processors or external to the processors in which case those can be communicatively coupled to the processors via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for performing, by an access stratum (AS) layer of a user equipment (UE), public land mobile network (PLMN) selection in a wireless communication system, the method comprising:

entering an RRC_INACTIVE state in a visited PLMN (VPLMN);

informing, to a non-access stratum (NAS) layer of the UE, whether or not there is on-going data transmission in the RRC_INACTIVE state, wherein the data transmission in the RRC_INACTIVE state is configured by a network;

receiving, from the NAS layer of the UE, a request of a PLMN searching upon that there is no on-going data transmission;

searching one or more available PLMNs according to the request of the PLMN searching;

informing, to the NAS layer of the UE, of a list of the one or more available PLMNs, wherein the list includes at least one of Home PLMN (HPLMN), Equivalent Home PLMN (EHPLMN), or higher priority PLMN than the VPLMN;

receiving, from the NAS layer of the UE, a selected PLMN among the list of the one or more available PLMNs; and selecting a cell in the selected PLMN while in the RRC_INACTIVE state.

2. The method of claim 1, further comprising:
receiving a request of PLMN selection.

3. The method of claim 2, further comprising:
performing the PLMN selection according to the request of PLMN selection.

4. The method of claim 1, further comprising: based on that a radio access network (RAN) paging message is received during the PLMN searching, stopping the PLMN searching.

5. The method of claim 1, further comprising:
based on that an uplink data or uplink signaling is detected during the PLMN searching, stopping the PLMN searching.

6. The method of claim 1, further comprising:
informing the NAS layer of the UE of a failure of the PLMN searching, based on that the PLMN searching is stopped.

7. The method of claim 1, wherein the UE communicates with at least one of a mobile terminal, a network or autonomous vehicles other than the UE.

8. A user equipment (UE) in a wireless communication system, the UE comprising:
a transceiver for transmitting or receiving a radio signal; and
a processor coupled to the transceiver,
the processor configured to:
enter an RRC_INACTIVE state in a visited public land mobile network (PLMN) (VPLMN);
inform, to a non-access stratum (NAS) layer of the UE, whether or not there is on-going data transmission in the RRC_INACTIVE state, wherein the data transmission in the RRC_INACTIVE state is configured by a network;
receive, from the NAS layer of the UE, a request of PLMN searching upon that there is no on-going data transmission;
search one or more available PLMNs according to the request of the PLMN searching;
inform, to the NAS layer of the UE, of a list of the one or more available PLMNs, wherein the list includes at least one of Home PLMN (HPLMN), Equivalent Home PLMN (EHPLMN), or higher priority PLMN than the VPLMN;
receive, from the NAS layer of the UE, a selected PLMN among the list of the one or more available PLMNs; and
select a cell in the selected PLMN while in the RRC_INACTIVE state.

9. The UE of claim 8, wherein the processor is further configured to:
receive a request of PLMN selection.

10. The UE of claim 9, wherein the processor is further configured to:
perform a PLMN selection according to the request of PLMN selection.

11. The UE of claim 8, wherein the processor is further configured to:
based on that a radio access network (RAN) paging message is received during the PLMN searching, stop the PLMN searching.

12. The UE of claim 8, wherein the processor is further configured to:
based on that an uplink data or uplink signaling is detected during the PLMN searching, stop the PLMN searching.

13. The UE of claim 8, wherein the processor is further configured to:
inform the NAS layer of the UE of a failure of the PLMN searching, based on that the PLMN searching is stopped.

* * * * *